(No Model.) 2 Sheets—Sheet 1.
W. R. PETRIE.
MACHINE FOR MAKING BLIND HOOKS.
No. 253,311. Patented Feb. 7, 1882.
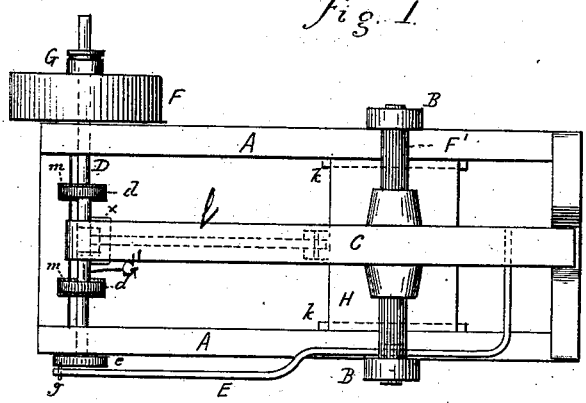
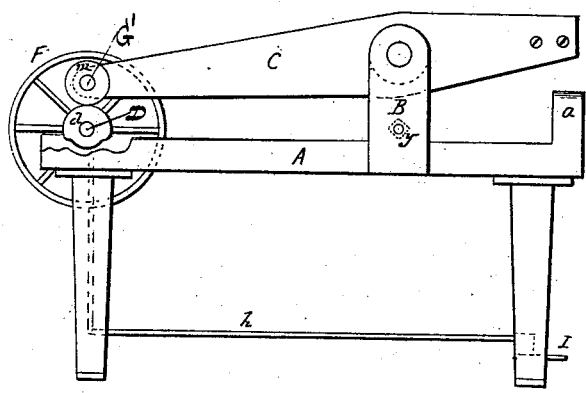
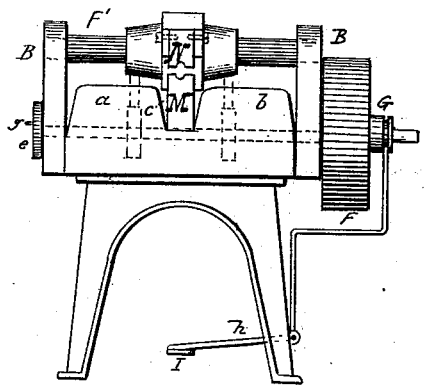
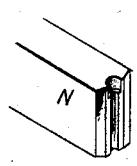 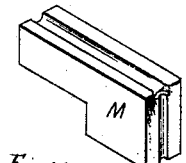 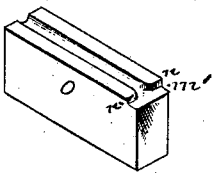 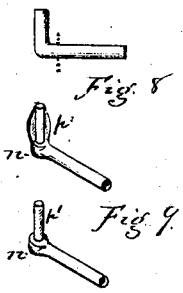
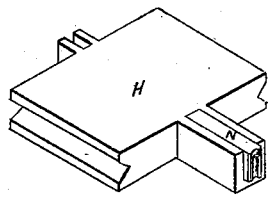
Witnesses.
Hiram A. Gray
David H. Petrie
Inventor
Walter R. Petrie
by Geo. Terry, Atty
N. PETERS, Photo-Lithographer, Washington, D.C.

(No Model.) 2 Sheets—Sheet 2.

W. R. PETRIE.
MACHINE FOR MAKING BLIND HOOKS.

No. 253,311. Patented Feb. 7, 1882.

Witnesses: Inventor
Daniel S. Glenney Jr Walter R. Petrie
Hiram A. Gray by George Terry
Atty

UNITED STATES PATENT OFFICE.

WALTER R. PETRIE, OF NEW HAVEN, CONNECTICUT.

MACHINE FOR MAKING BLIND-HOOKS.

SPECIFICATION forming part of Letters Patent No. 253,311, dated February 7, 1882.

Application filed May 3, 1881. (No model.)

*To all whom it may concern:*

Be it known that I, WALTER R. PETRIE, of New Haven, in the county of New Haven and State of Connecticut, have invented new and useful Improvements in Machines for Making Blind-Hooks, of which the following is a description.

My improvements are in machines for making "blind-hooks," as they are called, which, in connection with the straps attached to the blinds, form the hinges by which the blinds are hinged to the window-frames. The machines are equally well adapted to form all kinds of hooks which in connection with straps form hinges.

The invention consists in novel combinations of elements and in dies combined and adapted to form the hooks.

Figure 11:
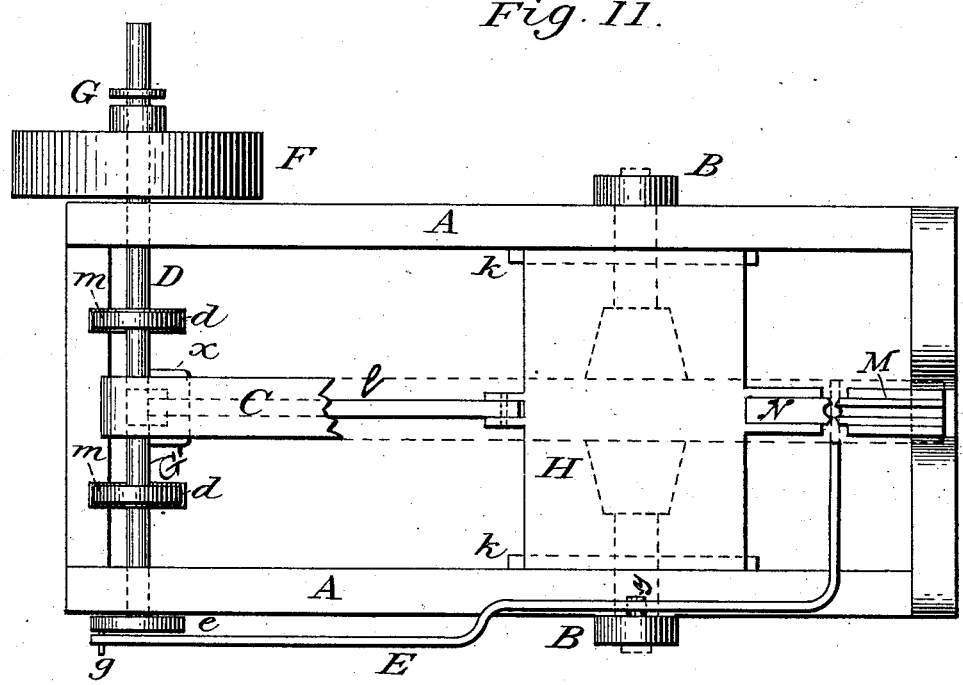
Figure 12:
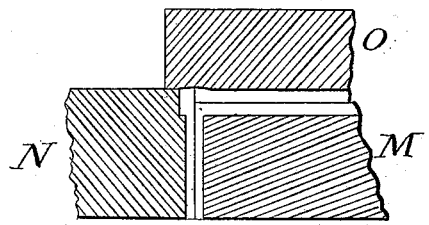

In the accompanying drawings, Figure 1 is a plan view of the machine; Fig. 2, a view of its side, and Fig. 3 a view of the front end of the machine. Figs. 4, 5, and 6 are perspective views of dies for forming the hooks; and Figs. 7, 8, and 9 are views of the hooks as they appear after the several operations of the machine upon them. Fig. 10 is a perspective view of the slide. Fig. 11 is a plan view of the machine, the beam being removed, and shows the slide and die in the same. Fig. 12 is a vertical section of the dies in the direction of their length, and shows the relative position of the dies as they are brought together to form the hooks.

To enable others to make and use my improved machine, I will describe it in detail.

A is a cast-iron rectangular frame, and has the front parts, *a* and *b*, rising above its other parts and forming the space *c*, Fig. 3, in which the die M is placed. To the frame are bolted uprights B, which form bearings for the shaft carrying the beam C. The frame is supported by four legs in the manner shown.

The shaft D revolves in bearings formed in the frame near its end, and has a crank, *x*, near its center, as shown in full and dotted lines in Fig. 1. To this shaft are attached cams *d*. The outer surfaces of these cams are circular, and the outer surface of each cam is divided into circular surfaces of circles of different diameters, as shown in Fig. 2. To the shaft D the circular disk *e* is attached, into which the pin *g* is inserted to operate the lever E.

The loose pulley F turns on the shaft D and serves the double purpose of pulley and fly-wheel. The clutch G is also arranged on the shaft and communicates the motion of the pulley to the shaft in the usual way and needs no description. The clutch is operated by the rod *h*, which turns in bearings on the legs of the machine, and has a pedal, *i*, formed on its front end.

The slide H is a rectangular piece of cast-iron, and has V-shaped grooves in its edges and slides on V-shaped ways *k* on the frame A. It has a depression or recess formed on its front end, in which the die N is held, as shown in Fig. 10. It is operated by the crank *x* by means of the connecting-rod *l*. (Shown by dotted lines in Fig. 1.)

The beam C is a cast-iron lever of the first class. It is fastened on the shaft F', which passes through it and is journaled in the upright parts B. The shaft G' also passes through and is fastened in the end of the beam. Journals are formed on the ends of this shaft, on which the rollers *m* are fastened so that they will be directly over the cams.

The lever E, Fig. 1, is a flat bar of wrought-iron, extending from the rear end of the frame and parallel with its side nearly to an upright part, B, where it is bent inward and passes inside of the upright part B, turns, and is fastened on a stud, *y*, Figs. 2 and 11, in the upright part. Its front end is bent at right angles to the side of the frame and comes in rear of the die M. A suitable gage is attached to the frame, against which the rods of iron come, the gage not being shown.

The die N, Fig. 4, has a semicircular groove on its front end to form the pintle *p'*. (Shown in Figs. 8 and 9.) The upper end of the groove is enlarged to form the outer end of the hook, the depth or length of the enlargement being a little greater than the diameter of the rods from which the hooks are made. The die is fastened in the slide H and adjusted so as to come under the notch *m'* in the die O.

The die M, Fig. 5, has a groove on its top to hold the rods from which the hooks are made. It also has a groove on its end like the groove on the end of the die N and for the same purpose. It is placed in the space *c*, Fig. 3, in the frame, its front end, as shown in Fig. 5, being the rear end when the die is in the machine.

The die O, Fig. 6, has a groove on its under side of the same size and for the same purpose as the groove on the top of the die M. It has the notch m' on its end cut to the bottom of the groove. It is fastened in the beam C, its upper side, as shown in Fig. 6, being its under side, and its front end being the rear end when in the beam. It is adjusted in the beam so that the ends n come even with the end of the die M.

The operations of the machine are several, successive, and distinct, as follows: The rods from which the hooks are made, being heated, are placed between the dies M and O, and, as the cams d raise the longer arm of the beam, are clamped and firmly held between them. As the pin g raises the longer arm of the lever E its front end bends the rod downward in front of the groove in the die M. The end of the rod being bent downward, the slide H, operated by the crank, moves toward the die M, and forms the pintle of the hook, as shown in Fig. 8, between the dies M and N. The rod is then withdrawn from the machine, the hook cut off, and the pintle is trimmed in a press with suitable dies.

Having described my machine and its mode of operation, what I claim as new, and desire to secure by Letters Patent, is—

The circular disk e, fastened on the end of the shaft D and provided with the pin g, in combination with the lever E, turning on the stud y as a fulcrum in the upright part B, its front end being bent at right angles to the side of the frame A and coming in rear of the die M, as set forth.

WALTER R. PETRIE.

Witnesses:
GEORGE TERRY,
DAVID H. PETRIE.